United States Patent
Kaneko et al.

(10) Patent No.: US 7,984,135 B2
(45) Date of Patent: Jul. 19, 2011

(54) GATEWAY APPARATUS, CONTROL INSTRUCTION PROCESSING METHOD, AND PROGRAM

(75) Inventors: Yu Kaneko, Yokohama (JP); Tomonori Maegawa, Tokyo (JP); Yusuke Doi, Yokohama (JP); Masahiro Ishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 322 days.

(21) Appl. No.: 12/407,855

(22) Filed: Mar. 20, 2009

(65) Prior Publication Data

US 2009/0249042 A1     Oct. 1, 2009

(30) Foreign Application Priority Data

Mar. 26, 2008  (JP) .................................. 2008-081012

(51) Int. Cl.
*G06F 15/173* (2006.01)
*G06F 15/16* (2006.01)
(52) U.S. Cl. ......................... 709/223; 709/225; 709/249
(58) Field of Classification Search .................. 709/249, 709/223; 712/225
See application file for complete search history.

(56) References Cited

U.S. PATENT DOCUMENTS

| 7,343,226 B2 * | 3/2008 | Ehlers et al. ................... 700/276 |
| 2002/0026533 A1 * | 2/2002 | Dutta et al. .................... 709/313 |
| 2005/0066024 A1 * | 3/2005 | Crocitti et al. ................ 709/223 |

FOREIGN PATENT DOCUMENTS

JP     2006-129282     5/2006

* cited by examiner

*Primary Examiner* — Alina N Boutah
*Assistant Examiner* — Asghar Bilgrami
(74) *Attorney, Agent, or Firm* — Ohlandt, Greeley, Ruggiero & Perle, L.L.P.

(57) ABSTRACT

A gateway apparatus includes a translator connected to a first network for one or more controllers to control one or more devices, and one or more aggregators. The translator includes an acquisition unit which acquires load information concerning a load on each of the controllers, a control instruction reception unit which receives a control instruction for a device from a client via the second network, a determination unit which determines whether the instruction is an aggregation target, based on the information, a first transfer unit which transfers the instruction to the aggregator corresponding to the instruction, and a second transfer unit which receives an aggregate control instruction from the aggregator. The aggregator includes a third transfer unit which receives the instruction from the translator, an aggregation unit which aggregates the plurality of instructions into one aggregate control instruction, and a fourth transfer unit which transfers the aggregate control instruction.

14 Claims, 16 Drawing Sheets

| User ID | Device ID | Instruction ID | Property name | Set value |

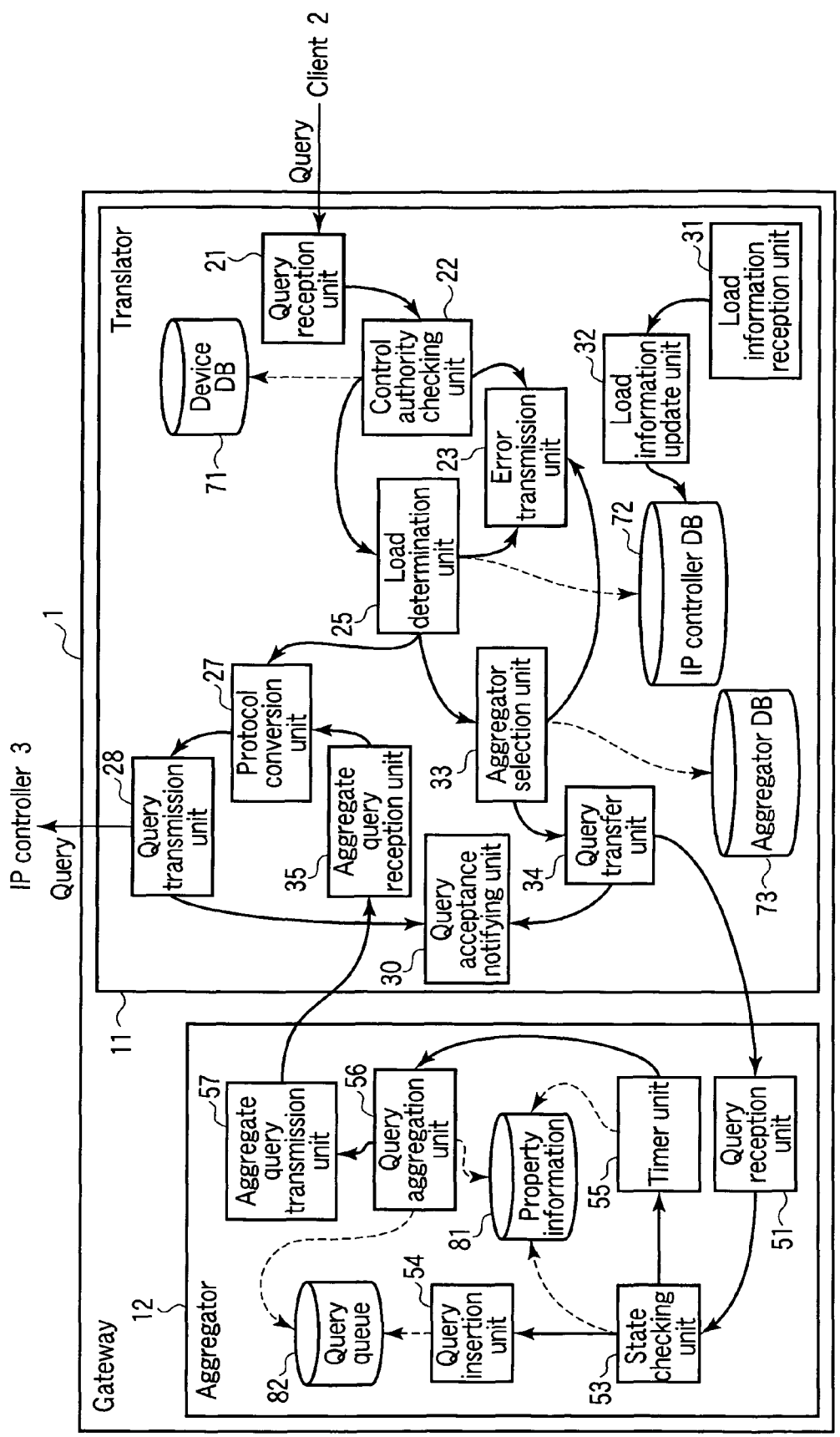
F I G. 3

| Device ID | IP controller ID | Tenant ID | User name | Instruction ID |
|---|---|---|---|---|

FIG. 4

| IP controller ID | Communication information | Load | Threshold T1 | Threshold T2 |
|---|---|---|---|---|

FIG. 5

| Aggregator ID | Device ID | Instruction ID | Communication information |
|---|---|---|---|

FIG. 6

| Aggregation period | Aggregation algorithm | Communication information | State |
|---|---|---|---|

FIG. 7

| User ID | Device ID | Instruction ID | Property name | Set value | IP controller ID |

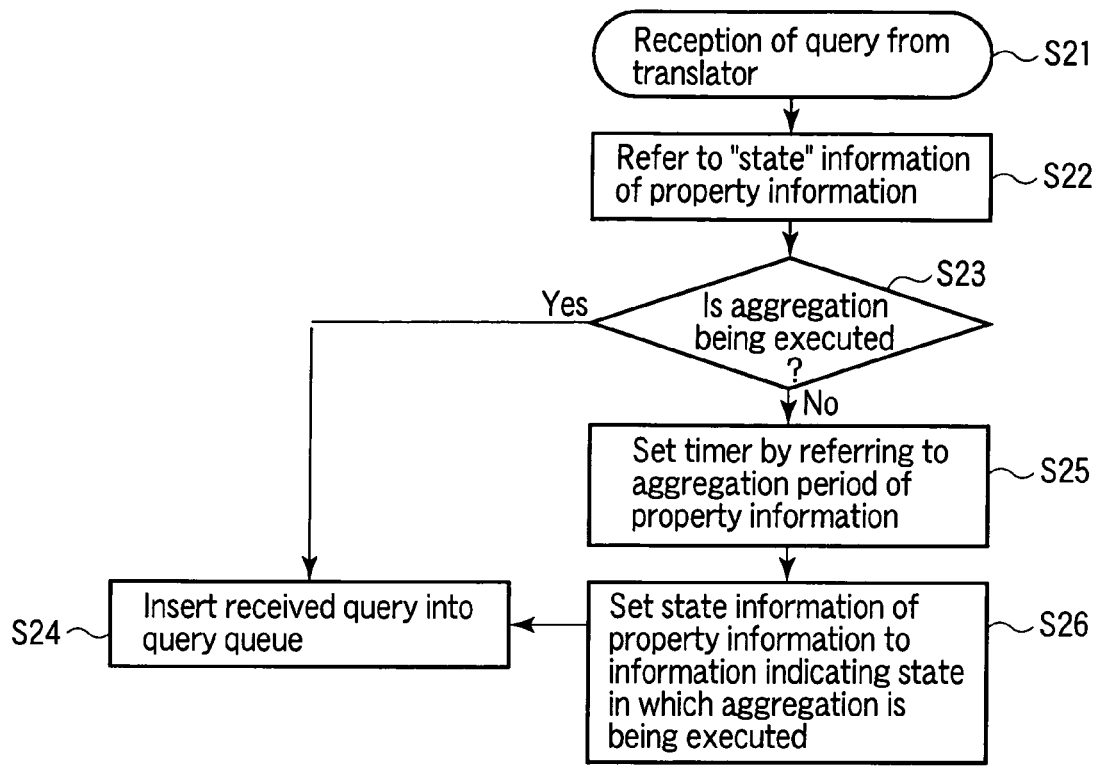
F I G. 10
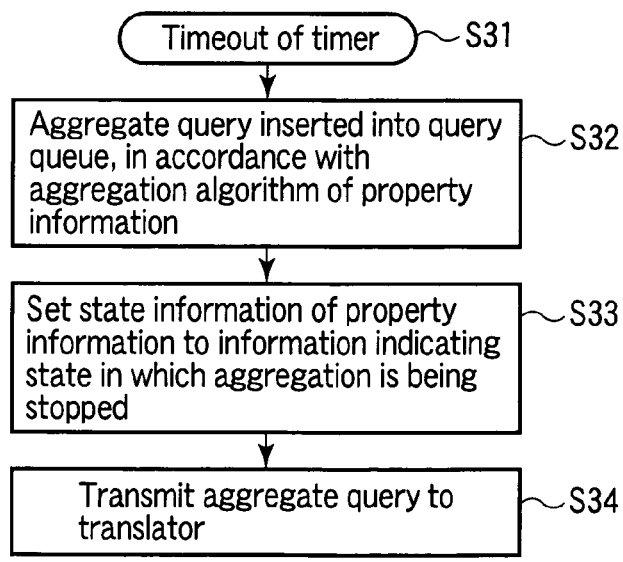
F I G. 11

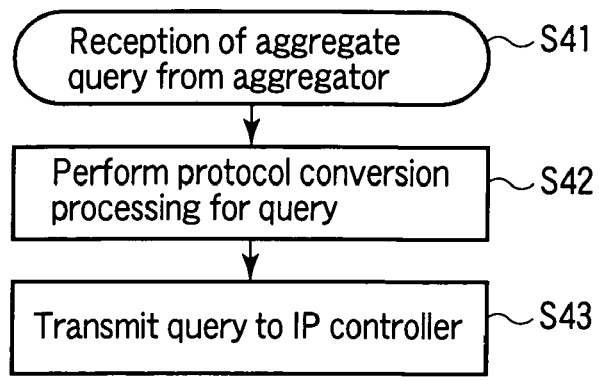
F I G. 12
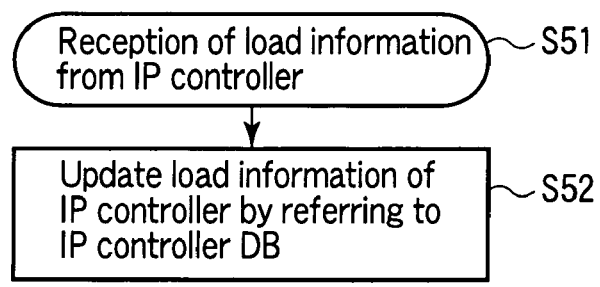
F I G. 13
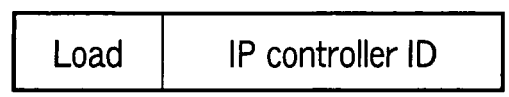
F I G. 14

| User ID | User authority | Tenant ID |
|---|---|---|

FIG. 16

| User ID | Device ID | Instruction ID | Property name | Set value | Priority | IP controller ID |
|---|---|---|---|---|---|---|

FIG. 18

| Aggregation period | Aggregation algorithm | Maximum value | Minimum value | Communication information | State |
|---|---|---|---|---|---|

FIG. 19

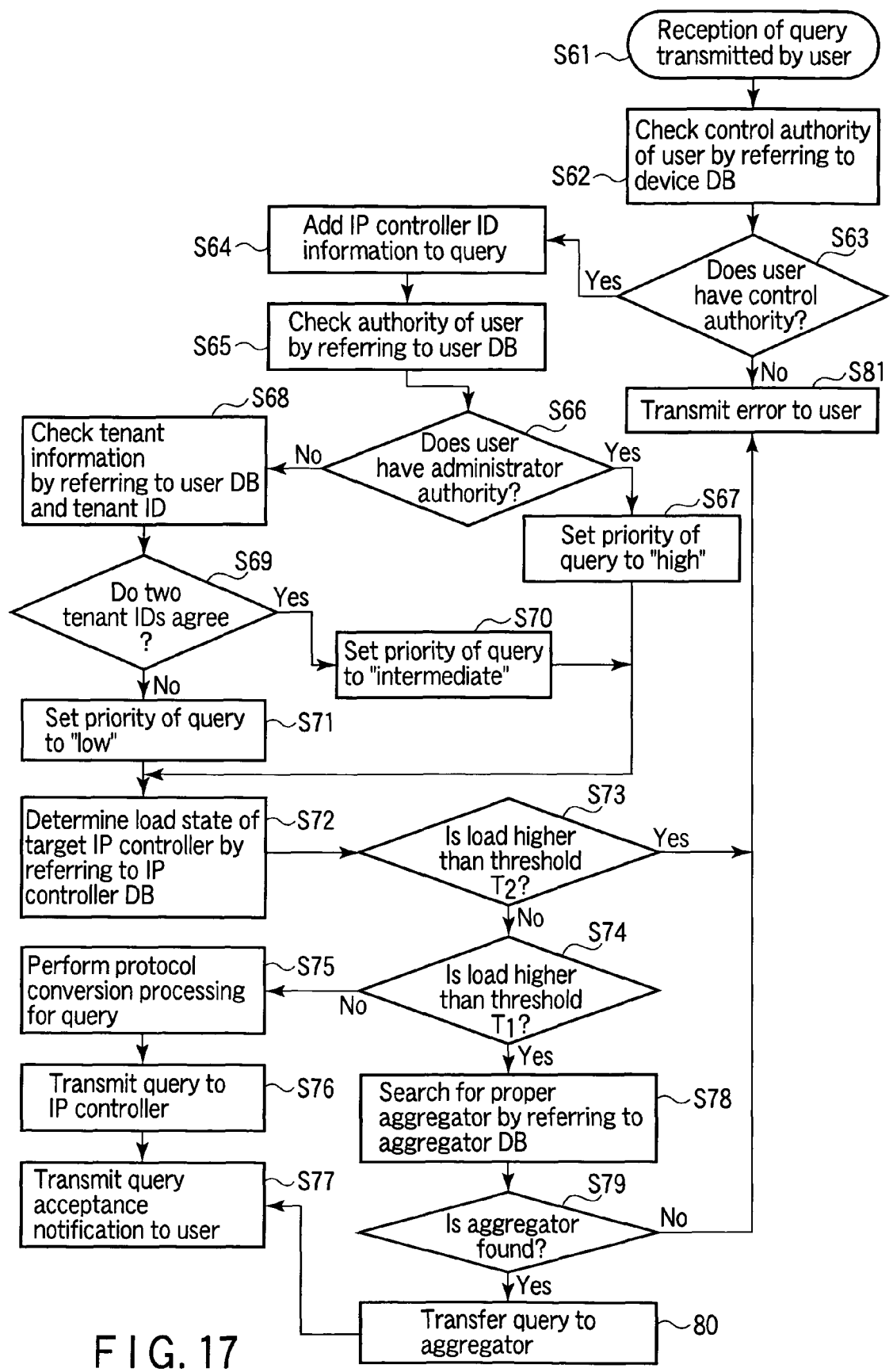
F I G. 17

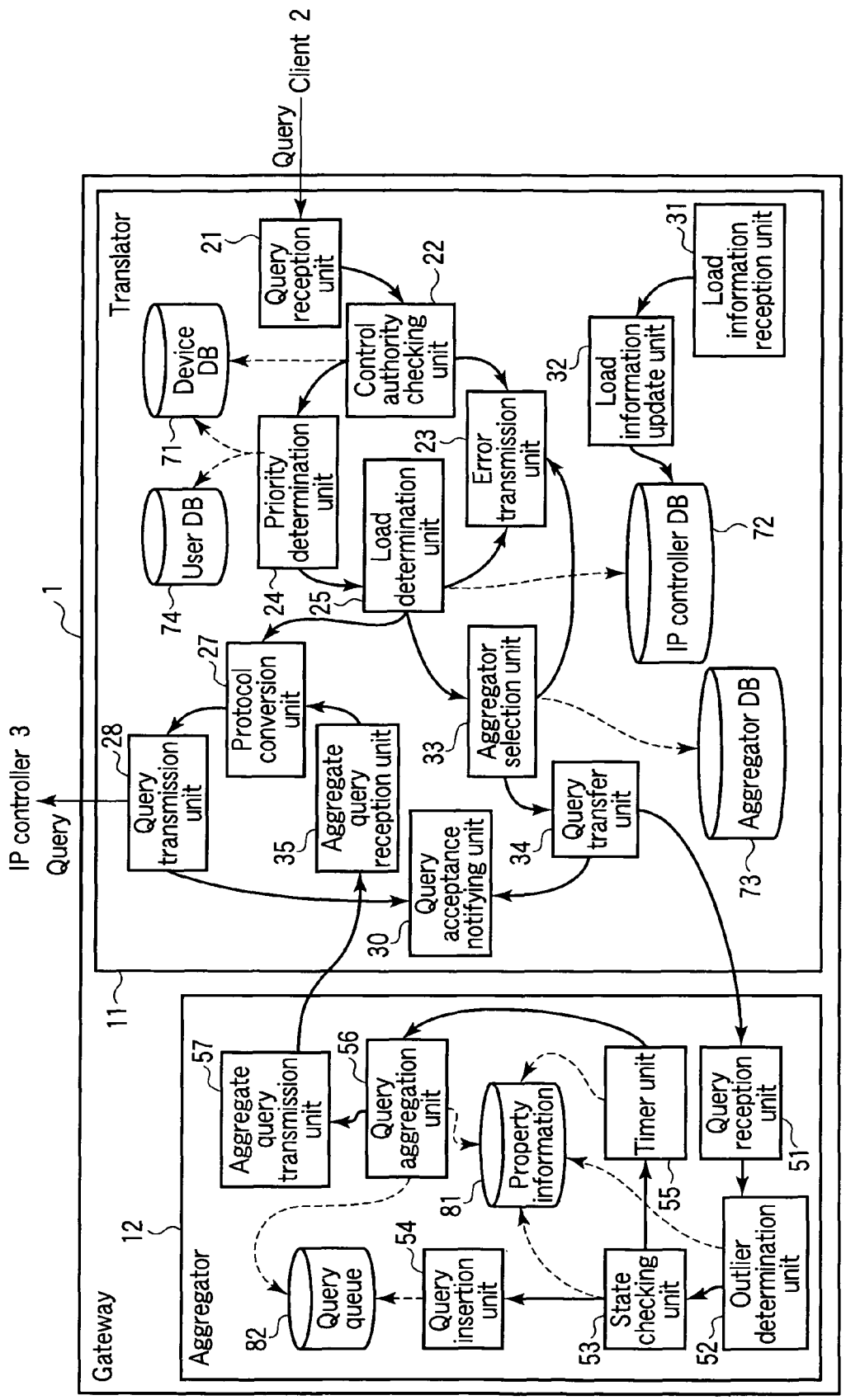
F I G. 20

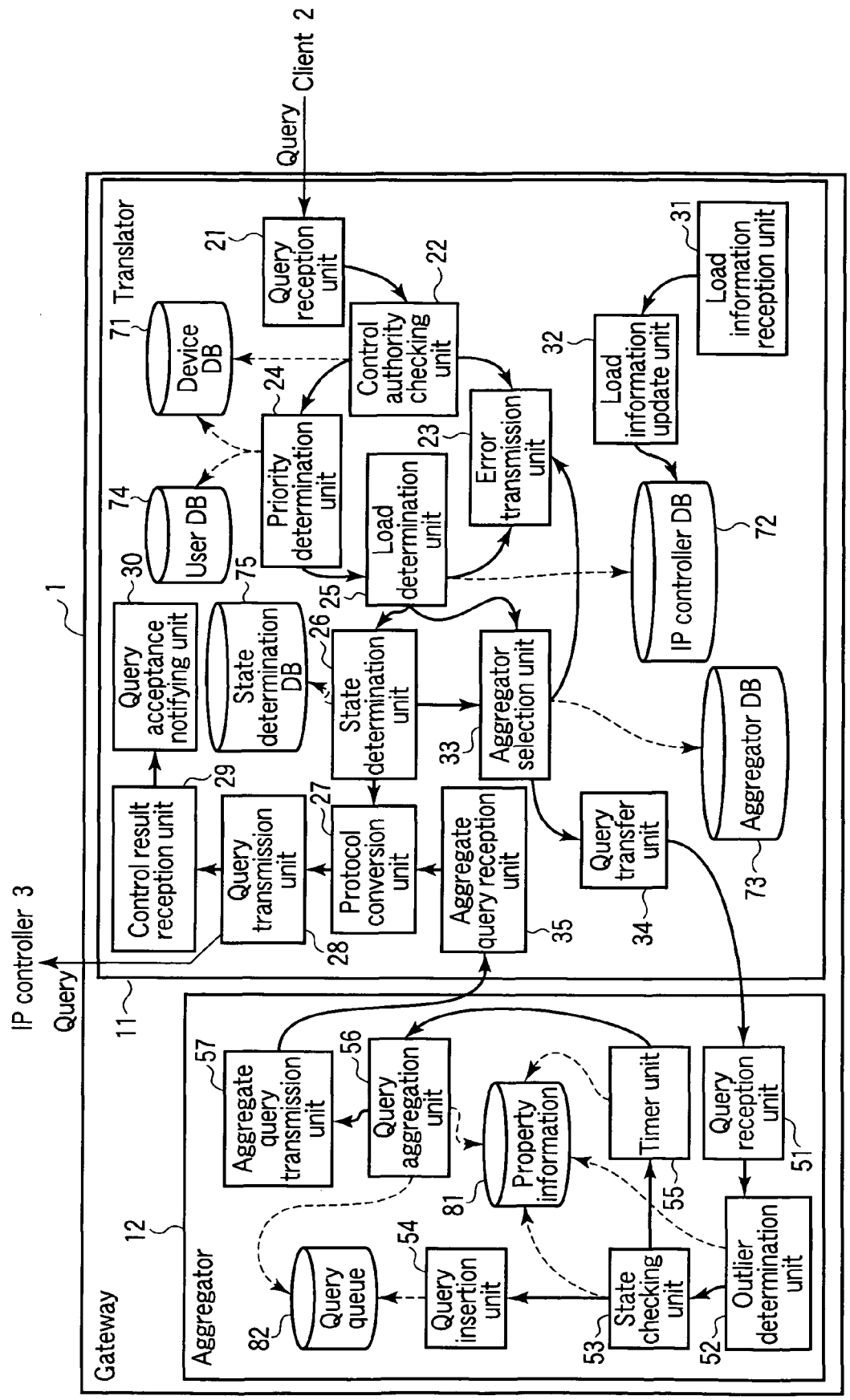
F I G. 26

GATEWAY APPARATUS, CONTROL INSTRUCTION PROCESSING METHOD, AND PROGRAM

CROSS-REFERENCE TO RELATED APPLICATIONS

This application is based upon and claims the benefit of priority from prior Japanese Patent Application No. 2008-081012, filed Mar. 26, 2008, the entire contents of which are incorporated herein by reference.

BACKGROUND OF THE INVENTION

1. Field of the Invention

The present invention relates to a gateway apparatus, a control instruction processing method, and a program.

2. Description of the Related Art

Recently, facility networks as networks for control systems in buildings and factories have been increasingly converted into IP-based networks. In IP-based facility networks, people can control facility equipment such as lightings and air conditioners via IP networks. For example, a lighting can be easily ON/OFF-controlled by clicking an image of the lighting displayed on the Web browser of a PC.

In general, a control instruction for facility equipment which is transmitted from a PC is supplied via a gateway and an IP controller. The gateway is located on the boundary between a network for a control system and a network for an OA system. For example, the gateway checks a control authority, and performs protocol conversion. The IP controller is located at the termination of an IP network. The IP controller processes a control instruction transmitted from the gateway and controls the facility equipment.

An IP-based facility network allows many people to simultaneously perform control more easily than the conventional technology (see JP-A 2006-129282 (KOKAI)).

In an IP-based facility network, therefore, there is a possibility of the occurrence of the number of control instructions exceeding the throughput capacity of an IP controller. In this case, the IP controller cannot process all the control instructions, and hence packet loss and the like occur. In addition, wasteful control may be provided for facility equipment. Assume that an air conditioner is performing preparatory operation to start heating operation. In this case, repeatedly performing control to start heating operation will impose an excess load on the facility equipment or the IP controller.

Conventionally, as the number of control instructions increases, the number of control instructions will exceed that can be processed by the IP controller, or wasteful control is provided for facility equipment.

BRIEF SUMMARY OF THE INVENTION

According to an aspect of the present invention, there is provided a gateway apparatus which includes a translator and not less than one aggregator, the translator being located on a boundary between a first network and a second network and performing protocol conversion of a control instruction, the first network being connected to not less than one controller for executing the control instruction for not less than one device, the second network being connected to not less than one client which transmits the control instruction, the aggregator aggregating the plurality of control instructions, wherein the translator includes an acquisition unit configured to acquire load information concerning a load on each of the controllers via the first network, a control instruction reception unit configured to receive a control instruction for a desired device from the client via the second network, a determination unit configured to determine whether the control instruction is an aggregation target, based on the load information on a controller corresponding to the device to which the control instruction is targeted, when the control instruction is received, a first transfer unit configured to transfer the control instruction to the aggregator corresponding to the control instruction, when it is determined that the control instruction is an aggregation target, and a second transfer unit configured to receive an aggregate control instruction from the aggregator, and the aggregator comprising includes a third transfer unit configured to receive the control instruction from the translator, an aggregation unit configured to aggregate the plurality of control instructions which has been received into one aggregate control instruction, and a fourth transfer unit configured to transfer the aggregate control instruction to the translator.

BRIEF DESCRIPTION OF THE SEVERAL VIEWS OF THE DRAWING

FIG. 3 is a block diagram showing an arrangement example of a gateway according to the embodiment;

FIG. 4 is a view showing an example of the attribute information of a device DB;

FIG. 5 is a view showing an example of the attribute information of an IP controller DB;

FIG. 6 is a view showing an example of the attribute information of an aggregator DB;

FIG. 7 is a view showing an example of the contents of property information;

FIG. 10 is a flowchart showing an example of operation to be performed when an aggregator according to the embodiment receives a query;

FIG. 11 is a flowchart showing an example of operation to be performed when the timer of the aggregator times out;

FIG. 12 is a flowchart showing an example of operation to be performed when the translator receives an aggregate query;

FIG. 13 is a flowchart showing an example of operation to be performed when the translator receives load information;

FIG. 14 is a view showing an example of the contents of load information;

FIG. 16 is a view showing an example of the attribute information of a user DB;

FIG. 17 is a flowchart showing an example of operation to be performed when a translator according to the second embodiment receives a query from a user;

FIG. 18 is a view showing an example of the information of a query to which priority information is added;

FIG. 19 is a view showing an example of the contents of property information having maximum and minimum values;

FIG. 20 is a block diagram showing an arrangement example of a gateway according to the third embodiment;

FIG. 26 is a block diagram showing an arrangement example of a gateway according to the fifth embodiment;

DETAILED DESCRIPTION OF THE INVENTION

The embodiments of the present invention will be described below with reference to the views of the accompanying drawing.

Assume that in the following description, "query" indicates a control instruction, "user" indicates a person who transmits a query, and "device" indicates facility equipment such as a lighting or an air conditioner.

First Embodiment

The first embodiment will exemplify a case in which a gateway aggregates queries in consideration of the load on an IP controller.

There will now be described an arrangement example of a network (e.g., a facility network) assumed in this embodiment referring to FIG. 1.

Figures 1, 2:
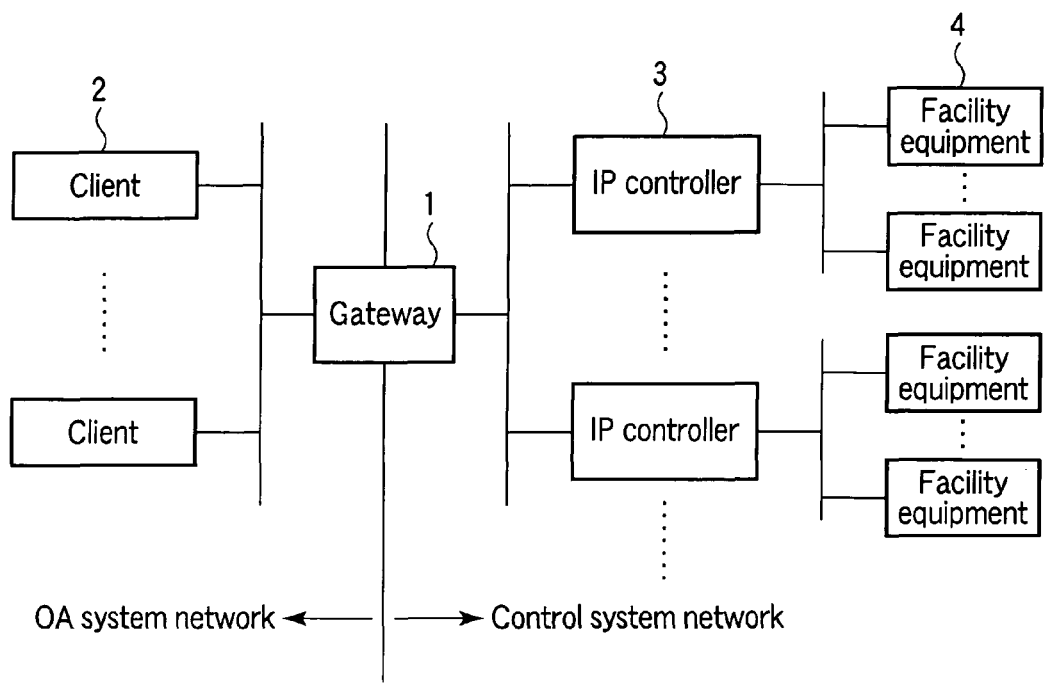
FIG. 1 is a block diagram showing an arrangement example of a network according to the first embodiment.
FIG. 2 is a view showing an example of the information of a query transmitted by a user.

As shown in FIG. 1, this network includes a gateway 1, clients 2, IP controllers 3, and devices 4.

The gateway 1 is located on the boundary between a control system network and an OA system network, and performs a check on a control authority, protocol conversion, and the like as in the conventional technology. In this embodiment, in addition to these functions, the gateway 1 aggregates queries.

The client 2 is a terminal having a function of transmitting a query to the desired device 4. The clients 2 are connected to the OA system network side. An arbitrary number of clients 2 can exist on this network.

The device 4 is facility equipment such as a lighting or an air conditioner. The devices 4 are connected to the control system network side. An arbitrary number of devices 4 can exist on this network.

The IP controller 3 is an apparatus for controlling the device 4. The IP controllers 3 are connected to the control system network side. The IP controller 3 can be provided for each device 4 or can be provided for each group of devices 4. Alternatively, only one device 4 can be provided for all the devices 4. Note that as the form of providing the IP controller 3 for each group of devices 4, various forms are available, including, for example, the form of providing an IP controller for each group of devices grouped with reference to the types of devices (for example, the form of providing an IP controller for each group of devices of the same type), the form of providing an IP controller for each group of devices grouped with reference to the places where devices are installed (for example, the form of providing an IP controller for each group of devices installed on the same floor or in the same tenant in a building), and the form of combining the above forms.

The following description is based on the assumption that there is one gateway 1. However, this embodiment can also be applied to an arrangement including a plurality of gateways 1.

Referring to FIG. 1, the client 2 transmits a query addressed to the IP controller 3, which manages the device 4 as a control target, on the basis of, for example, operation by a user. The query transmitted from the client 2 reaches the gateway 1 first. Upon receiving the query, the gateway 1 performs a check on a control authority, protocol conversion, and the like. In this case, in this embodiment, the gateway 1 aggregates queries which satisfy conditions for aggregation. The gateway 1 transmits a query obtained by aggregation processing or a single query outside the range of aggregation processing to the IP controller 3 which the query is addressed. Upon receiving a query from the gateway 1, the IP controller 3 located at the termination of the IP network processes the received query and controls the device 4 as a control target.

This embodiment will be described by exemplifying a case in which the client 2 issues a query to "set an arbitrary value in the property of the device 4".

FIG. 2 exemplifies information which a query has.

The query shown in FIG. 2 includes "user ID" which is the identification information of a user who owns the query, "device ID" which is the identification information of a device as a control target, "instruction ID" which is the identification information of the query, "property name" which is the name of a property which the device has, and "set value" which is a value set in the property. The query in FIG. 2 is, for example, the one which is generated to make temperature setting for an air conditioner, illuminance setting for a lighting, or open/close setting for a blind.

In the first embodiment, a query like that shown in FIG. 2 is an aggregation target. Air conditioner and lighting control results are reflected in a plurality of users. If, however, control is simply performed by sequentially processing queries from the respective users, for example, only the intention of a user who has finally transmitted a query is reflected in control. The gateway 1 therefore performs aggregation processing of, for example, aggregating the set values of queries received from a plurality of users and transmitting the resultant data as one query to the IP controller 3. This can suppress the load on the IP controller 3 while performing control reflecting the intentions of a plurality of users.

Referring to FIG. 1, the query transferred from the client 2 to the gateway 1 complies with the protocol used between the client 2 and the gateway 1. The query supplied from the gateway 1 to the IP controller 3 complies with the protocol used between the gateway 1 and the IP controller 3. Since this embodiment is premised on different protocols, the gateway 1 has a function of performing protocol conversion of the query received from the client 2 (see a protocol conversion unit 27 in FIG. 3 and the like). That is, the gateway 1 performs protocol conversion of a query, and gives the resultant query to the IP controller 3.

There will now be described an arrangement example of the gateway 1 referring to FIG. 3.

As shown in FIG. 3, the gateway 1 includes a translator 11 and an aggregator 12. The translator 11 and the aggregator 12 can be implemented as, for example, processes (i.e., programs on which they are based) operating on the gateway 1.

The translator 11 performs protocol conversion processing for the query received from a user and transfers the query to the IP controller 3. The translator 11 grasps the load on the IP controller 3. If the load on the IP controller 3 is high, the translator 11 transfers the query to the aggregator 12. The translator 11 then receives the query obtained by aggregation by the aggregator 12 and transfers it to the IP controller 3.

The aggregator 12 aggregates queries received from the translator 11, and returns the resultant query to the translator 11. This embodiment will be described by exemplifying a case in which one aggregator 12 aggregates specific instructions for the specific device 4. The number of aggregators 12 which are to exist is set by a manager. Note that FIG. 3 exemplifies only one aggregator 12.

The query obtained by aggregation by the aggregator 12 will be referred to as an "aggregate query" hereinafter. The information which an aggregate query has is generally the same as that of a general query.

As shown in FIG. 3, the translator 11 of this embodiment includes seven transmission/reception units, i.e., a query reception unit 21, a query transfer unit 34, a query transmission unit 28, an aggregate query reception unit 35, a load information reception unit 31, an error transmission unit 23, and a query acceptance notifying unit 30. These functional blocks are used to exchange data with other processes or machines.

The translator 11 includes three DBs, i.e., a device database (device DB) 71, an IP controller database (IP controller DB) 72, and an aggregator database (aggregator DB) 73. Information setting in DBs is generally performed by, for example, the managers of buildings and factories. However, this embodiment is not limited to this.

FIG. 4 shows an example of the attributes of the device DB 71.

In example in FIG. 4, the device DB 71 includes five attributes, i.e., {device ID, IP controller ID, tenant ID, user ID, instruction ID}. The main key of them is the device ID. For each device ID, the following are set: "IP controller ID" which is the identification information of an IP controller which manages the device; "tenant ID" which is the identification information of a tenant in which the device is installed; "user ID" of a user who can control the device; and "instruction ID" of an instruction which can be executed for the device.

If, for example, the device is an air conditioner, executable instructions include a temperature set instruction, a cooling operation start instruction, and a heating operation start instruction.

FIG. 5 shows an example of the attributes of the IP controller DB 72.

In the example in FIG. 5, the IP controller DB 72 includes five attributes, i.e., {IP controller ID, communication information, load, threshold $T_1$, threshold $T_2$}. The main key of them is the IP controller ID. For each IP controller, the following are set: "communication information" which is information to be used to transfer a query to the IP controller; "load" which is an index representing the load on the IP controller; and two thresholds, i.e., "threshold $T_1$" and "threshold $T_2$".

Communication information depends on the protocol used between the gateway 1 and an IP controller. If, for example, BACnet/IP is used, an IP address is used. If SOAP is used, a URI is used. This embodiment exemplifies the use of BACnet/IP.

Indexes indicating loads include, for example, the usage rate of the CPU of an IP controller, the idle state rate of the CPU of the IP controller, and the number of queries received by the IP controller in a predetermined period of time in the past. Any one of the indexes can be used. This embodiment exemplifies a case in which the CPU usage rate of the IP controller is used as an index.

In the example in FIG. 5, the number of threshold attributes is two. However, this embodiment is not limited to this. This embodiment will be described by exemplifying a case in which three types of processing are executed in accordance with load states, and hence exemplifies a case in which the number of threshold attributes is two.

FIG. 6 shows an example of the attributes of the aggregator DB 73.

In the example in FIG. 6, the aggregator DB 73 includes four attributes, i.e., {aggregator ID, device ID, instruction ID, communication information}. The main key of them is the aggregator ID. For each aggregator, the following are set: a combination of "device ID" of a device as a control target and "instruction ID" for the device, which a query to be aggregated by the aggregator should have; and "communication information" which is information to be used to transfer the query to the aggregator.

In this embodiment, the aggregator 12 is specified by a combination of a device ID and an instruction ID.

Communication information depends on a communication method between a translator and an aggregator. If, for example, a socket is used, a port number is used. If a UNIX (registered trademark) pipe is used, a file descriptor is used. This embodiment exemplifies the use of a socket.

As shown in FIG. 3, the translator 11 includes a control authority checking unit 22, a load determination unit 25, a protocol conversion unit 27, an aggregator selection unit 33, and an information update unit 32. These functional blocks operate while referring to the three DBs described above.

As described above, the number of aggregators 12 which are to exist in this embodiment is set by the manager. As shown in FIG. 3, each aggregator 12 includes a query reception unit 51, a state checking unit 53, a query insertion unit 54, a timer unit 55, a query aggregation unit 56, an aggregate query transmission unit 57, property information 81, and a query queue 82.

FIG. 7 shows an example of the contents of the property information 81.

In the example in FIG. 7, the property information 81 includes "period information for query aggregation", "aggregation algorithm", "communication information", and "state information". The manager sets the aggregator 12 by setting the property information 81.

Period information for query aggregation is, for example, 10 sec or 100 sec.

As an aggregation algorithm, there are available "average value", "median value", "random selection of query", "selection of last received query", and the like. The manager selects one of them in consideration of an operation policy. Since a query as an aggregation target is a query to set an arbitrary value in a given device, the manager can set the aggregator 12 by only setting an aggregation period and selecting a specified aggregation algorithm.

Communication information depends on a communication method between the translator 11 and the aggregator 12. If, for example, a socket is used, a port number is used. If a UNIX pipe is used, a file descriptor is used. This embodiment exemplifies the use of a socket.

State information is information which indicates whether the aggregator 12 is executing query aggregation or not.

The operation of the translator 11 at the time of reception of a query from a user will be described next with reference to FIGS. 3 and 8 and the like.

When receiving the query transmitted by a user via the query reception unit 21 (step S1), the translator 11 causes the control authority checking unit 22 to refer to the device DB 71 (step S2). The query contains a user ID, the device ID of a control target, and the instruction ID of a control instruction to be executed for the device. The translator 11 acquires the IP controller ID of an IP controller which manages the device, the user ID of a user who has authority to control the device, and the instruction ID of an instruction which can be executed for the device by referring to the device DB 71 using the device ID contained in the query as a key.

If the user ID and instruction ID which the query has do not match the acquired user ID and instruction ID (step S3), the translator 11 determines that the user does not have authority to control, and causes the error transmission unit 23 to return an error to the query sender (step S14).

Upon determining that the user has authority to control (step S3), the translator 11 adds, to the query, the IP controller ID information of an IP controller which manages the device (step S4), and causes the load determination unit 25 to refer to the IP controller DB 72 (step S5).

Figures 8, 9:
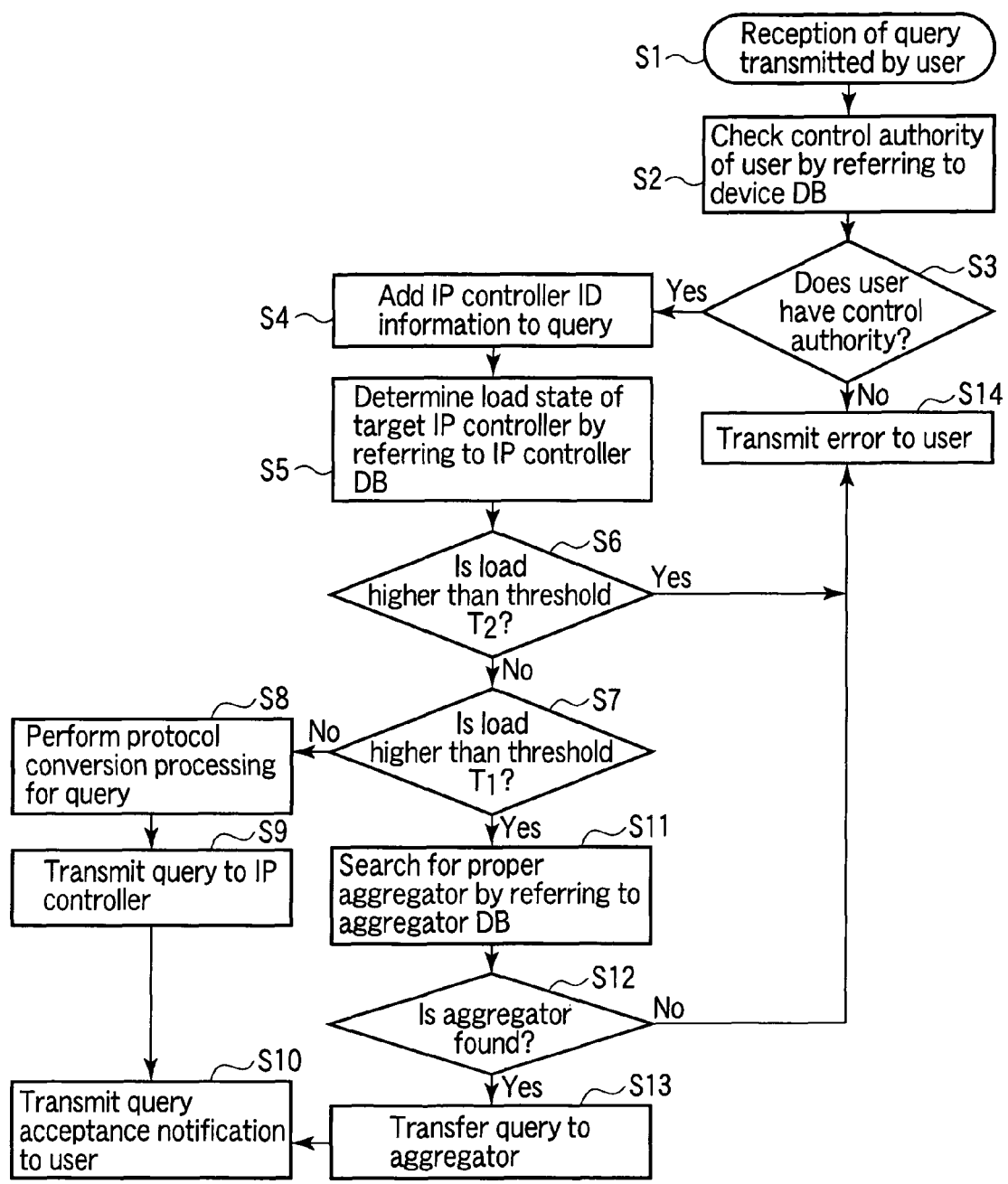
FIG. 8 is a flowchart showing an example of operation to be performed when a translator according to the embodiment receives a query from a user.
FIG. 9 is a view showing an example of the information of a query to which an IP controller ID is added.

FIG. 9 shows an example of information which a query to which IP controller ID information is added has.

The load determination unit 25 acquires the load on the IP controller and thresholds (two thresholds in this case) by referring to the IP controller DB 72 using the IP controller ID added to the query as a key. Assume that threshold $T_2$>threshold $T_1$.

If the load is higher than the threshold $T_2$ (step S6), the translator 11 determines that the IP controller is in a state in which it cannot process the query, and causes the error transmission unit 23 to transmit an error to the user (i.e., the client 2 as the query transmission source) (step S14). In this case, the received query is discarded.

If the load is equal to or less than the threshold $T_2$ (step S6) and is equal to or less than the threshold $T_1$ (step S7), the translator 11 causes the protocol conversion unit 27 to perform protocol conversion processing for the query (step S8), and causes the query transmission unit 28 to transmit the query to the IP controller (step S9). The translator 11 then causes a query acceptance notifying unit 30 to notify the user of the acceptance of the query (step S10). The IP address of the IP controller is determined by referring to the IP controller DB 72 using the IP controller ID as a key.

If the load is equal to or less than the threshold $T_2$ and is higher than the threshold $T_1$ (steps S6 and S7), the translator 11 causes the aggregator selection unit 33 to refer to the aggregator DB 73 (step S11).

The aggregator selection unit 33 refers to the aggregator DB 73 to search for an aggregator ID which matches both the device ID and instruction ID contained in the query. If no proper aggregator ID is found (step S12), the translator 11 determines that the query cannot be aggregated, and causes the error transmission unit 23 to transmit an error to the user (step S14). If a proper aggregator ID is found (step S12), the translator 11 causes the query transfer unit 34 to transfer the query to the aggregator 12 (step S13). The translator 11 then causes the query acceptance notifying unit 30 to notify the user of the acceptance of the query (step S10). Information (port number) necessary to transfer the query to the aggregator 12 is acquired by referring to the aggregator DB 73 using the aggregator ID as a key.

The operation of the aggregator 12 at the time of reception of a query will be described next with reference to FIGS. 3 and 10 and the like.

When receiving a query from the translator 11 via the query reception unit 51 (step S21), the aggregator 12 causes the state checking unit 53 to refer to the state information of the property information 81 (step S22).

If the state indicates that aggregation is being executed (step S23), the aggregator 12 causes the query aggregation unit 56 to insert the received query into the query queue 82 (step S24).

If the state indicates that aggregation is not being executed (step S23), the aggregator 12 changes the state information of the property information 81 to information indicating that a state in which aggregation is being executed (step S26), and causes the query aggregation unit 56 to insert the received query into the query queue 82 (step S24). In this case, the aggregator 12 causes the timer unit 55 to refer to the period information to set the timer (step S25). The timer can be implemented by, for example, setting an alarm signal in the process of the aggregator 12.

The operation of the aggregator 12 at the time when the timer has timed out will be described next with reference to FIGS. 3 and 11 and the like.

When the timer has timed out (step S31), the aggregator 12 causes the query aggregation unit 56 to acquire an accumulated query group from the query queue 82 and aggregate the queries in accordance with the aggregation algorithm of the property information 81 (step S32).

If the aggregation algorithm is "average", the aggregator 12 calculates the average value of the respective values of the query group and creates an aggregate query with the calculated value as a set value. If the aggregation algorithm is "median value", the aggregator 12 calculates the median value of the query group and creates an aggregate query with the calculated value as a set value. If the aggregation algorithm is "random", the aggregator 12 randomly selects one query from the query group and sets it as an aggregate query. If the aggregation algorithm is "selection of last received query", the aggregator 12 sets the last query of the queue as an aggregate query.

After query aggregation is complete, the aggregator 12 changes the state information of the property information 81 to information indicating that aggregation is being stopped (step S33), and causes the aggregate query transmission unit 57 to transmit the aggregate query to the translator 11 (step S34). Information necessary for communication with the translator 11 is acquired by referring to the communication information of the property information 81.

According to the above description, the timer is used as a criterion for the execution of aggregation, the criterion for the execution of aggregation is not limited to the timer. For example, various other methods are conceivable, including a method of executing aggregation when the load on the IP controller becomes lower than a given threshold and a method of executing aggregation when a predetermined number of queries is received. In this case, it suffices to set information other than period information in property information.

The operation of the translator 11 at the time of reception of an aggregate query from the aggregator 12 will be described next with reference to FIGS. 3 and 12 and the like.

When receiving an aggregate query from the aggregator 12 via the aggregate query reception unit 35 (step S41), the translator 11 causes the protocol conversion unit 27 to perform protocol conversion processing for the aggregate query (step S42). The translator 11 then causes the query transmission unit 28 to transmit the aggregate query to the IP controller (step S43). The IP address of the IP controller is determined by referring to the IP controller DB 72 using the IP controller ID as a key.

The operation of the translator 11 at the time of reception of load information from the IP controller will be described next with reference to FIGS. 3 and 13 and the like.

When receiving load information from the IP controller via the load information reception unit 31 (step S51), the translator 11 causes the information update unit 32 to refer to the IP controller DB 72 and update the value of "load" (step S52).

FIG. 14 shows an example of the contents of load information received from the IP controller. An entry in which load information should be updated is determined by using the IP controller ID contained in the load information.

As described above, the gateway of this embodiment grasps the load on the IP controller in this manner. If the load is high, the gateway aggregates queries to "set an arbitrary value in the property of a given device". This makes it possible to reduce the query processing load on the IP controller while performing control reflecting the intentions of a plurality of users.

Note that since queries to be aggregated are control instructions to set an arbitrary value in a given device, the manager can set the aggregator 12 by only setting an aggregation period and an aggregation algorithm. Aggregation algorithms include predefined numerical calculation algorithms such as "average" and "median value". The manager can perform flexible query aggregation by selecting an algorithm.

The aggregator 12 need not be a process on the gateway 1. For example, this process may be a Web service process operating on a machine other than the gateway 1. In this case, the URI of a query reception service of the aggregator 12 is stored in the communication information of the aggregator DB 73. The IP address and port number of the gateway 1 are stored in the communication information which the aggregator 12 has.

As described above, according to this embodiment, the gateway can reduce the query processing load on an IP controller or device by aggregating queries.

In addition, according to this embodiment, the gateway can reduce the processing load on an IP controller or device while performing control reflecting the intentions of a plurality of users by grasping the state of the IP controller or device and aggregating queries in accordance with the state.

Second Embodiment

The second embodiment will exemplify the operation to be performed in consideration of the priorities of queries when the gateway in the first embodiment aggregates the queries. The following description mainly concerns differences from the first embodiment.

When the priorities of queries are to be considered in a facility network, it is possible to consider two points, i.e., the authority of a user and a tenant to which the user and a device belong. In general, a facility network includes a manager having an administrator authority and general users having only a general authority. It is appropriate to give higher priority to a query from the manager of the building than to a query from a general user. Assume that users belonging to a plurality of tenants have transmitted queries to a device existing in a given tenant. In this case, it is appropriate to give higher priority to a query from a user belonging to the same tenant as the device. This embodiment exemplifies a case in which the priorities of queries are classified into three levels: high, intermediate, and low, by using the above two indexes:

There will now be described an arrangement example of a gateway referring to FIG. 15.

A difference from the first embodiment is that a translator 11 includes a user database (user DB) 74 and a priority determination unit 24 in addition to the arrangement of the first embodiment (FIG. 3).

FIG. 16 shows an example of the attribute information of the user DB 74.

The user DB 74 includes three attributes, i.e., {user ID, user authority, tenant ID}. The main key of them is the user ID. For each user ID, "user authority" indicating the authority of the user and "tenant ID" of the tenant to which the user belongs are set.

User authorities include, for example, an administrator authority and a general user authority.

The priority determination unit 24 grasps the authority of a query sender by referring to the user DB 74 using the user ID which the query has as a key. Referring to both the user DB 74 and the device DB 71 can determine whether the tenant to which a query sender belongs matches the tenant in which a control target device exists.

The operation of the translator 11 at the time of reception of a query from a user will be described next with reference to FIGS. 15 and 17 and the like.

Steps S61 to S64 in the sequence in FIG. 17 are respectively the same as steps S1 to S4 in the sequence in FIG. 8. Steps S72 to S81 in the sequence in FIG. 17 are respectively the same as steps S5 to S14 in the sequence in FIG. 8.

When receiving a query from a user via a query reception unit 21 (step S61), the translator 11 causes a control authority checking unit 22 to check the control authority of the user (step S62).

If the user (i.e., the client 2 as the query sender) has a control authority on the device (step S63), the translator 11 adds, to the query, IP controller ID information of the IP controller which manages the device (step S64), and causes the priority determination unit 24 to determine the priority of the query (step S65). The priority determination unit 24 checks the authority of the query sending user by checking the user DB 74 using the user ID which the query has as a key.

If the query sending user has an administrator authority (step S66), information indicating that the priority is high is added to the query (step S67).

If the query sending user has no administrator authority (step S66), the translator 11 refers to both the user DB 74 and the device DB 71 to check whether the tenant ID of the query sending user matches the tenant ID of the control target device (step S68). If the two tenant IDs (i.e., the tenant ID of the query sending user and the tenant ID of the control target device) agree (step S69), the translator 11 adds information indicating that the priority is intermediate to the query (step S70). If the two tenant IDs do not agree (step S69), the translator 11 adds information indicating that the priority is low to the query (step S71).

FIG. 18 shows an example of a query to which priority information is added.

Processing to be performed after priority information is added to a query is the same as the operation of the translator 11 in the first embodiment. The translator 11 causes a load determination unit 25 to determine the load state of the IP controller, and performs one of the processes: returning an error to the user, performing protocol conversion processing for the query, and transferring the query to a proper aggregator 12.

An example of the operation of the aggregator 12 at the time when the timer has timed out will be described next with reference to FIGS. 15 and 11 and the like. Note that an example of the operation of the aggregator 12 in this embodiment at the time when the timer has timed out is the same as that in the first embodiment (FIG. 11) except that aggregation in step S32 is performed in consideration of priorities.

When the timer has timed out (step S31), the aggregator 12 causes a query aggregation unit 56 to acquire an accumulated query group from a query queue 82, and aggregates queries in accordance with the aggregation algorithm of property information 81 (step S32).

In this case, the aggregation algorithm in this embodiment performs calculation in consideration of the priority information of each query. If, for example, the aggregation algorithm is "average", "median value", or "random", weights $w_1$, $w_2$, and $w_3$ are set to $w_3 > w_2 > w_1$ (for example, $w_3 = 3$, $w_2 = 2$, and $w_1 = 1$). The algorithm then calculates an aggregate value by setting one query with priority=high to $w_3$ queries, one query with priority=intermediate to $w_2$ queries, and one query with priority=low to $w_1$ query.

This makes the aggregation result reflect the set value of a query with a higher priority more than the set value of a query with a lower priority.

After the query aggregation is complete, the aggregator 12 changes the state information of the property information 81 to information indicating that aggregation is being stopped (step S33), and causes the aggregate query transmission unit 57 to transmit the aggregate query to the translator 11 (step S34). Information necessary for communication with the translator 11 is acquired by referring to the communication information of the property information 81.

In this manner, the gateway of this embodiment assigns priorities to queries in accordance with the authorities or departments of users, and aggregates the queries in consideration of the priorities. This makes it possible to reduce the query processing load on the IP controller while performing control preferentially reflecting the intention of the manager or the intention of users belonging to a single tenant as that of a control target.

Third Embodiment

The third embodiment will exemplify the operation of performing aggregation upon excluding "outliers" when the gateway in the second embodiment aggregates queries. The following description mainly concerns differences from the second embodiment. Obviously, however, it is possible to apply, to the first embodiment, "the arrangement for performing aggregation upon excluding outliers when the gateway aggregates queries" according to the third embodiment.

Assume that in a facility network, some user has transmitted a query having a set value which apparently deviates from an allowable range due to an operation error, curiosity, or the like. In this case, if this query is aggregated by an aggregator 12, there is a possibility that the aggregation result does not reflect the intention of many users. For example, it is not desirable that some user transmits a query to set the set temperature of an air conditioner to −5°, and the aggregator 12 calculates the average value of queries including this query. It is therefore desirable to exclude values which cannot be allowed by the air conditioner from aggregation targets.

FIG. 19 shows an example of property information 81 in this embodiment. The property information 81 of the aggregator 12 in this embodiment contains pieces of information of "maximum value" and "minimum value" in addition to "aggregation period", "aggregation algorithm", "communication information", and "state information" in the previous embodiment (FIG. 7).

The aggregator 12 excludes a query containing an outlier from aggregation targets by referring the maximum and minimum values. An outlier is a set value which is larger than the maximum value or smaller than the minimum value.

There will now be described an arrangement example of the gateway referring to FIG. 20.

Figure 15:
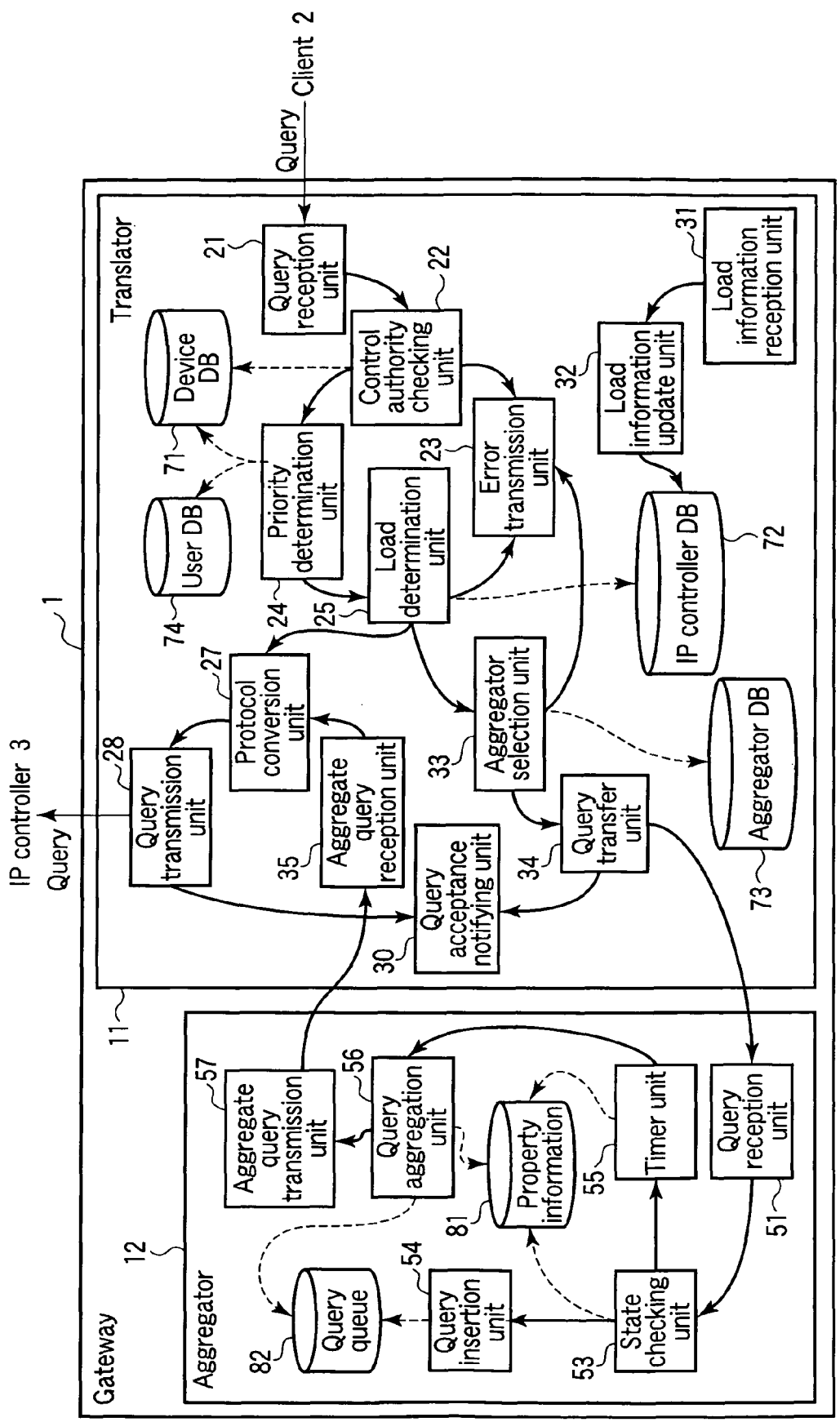
FIG. 15 is a block diagram showing an arrangement example of a gateway according to the second embodiment.

A difference from the second embodiment is that the aggregator 12 includes an outlier determination unit 52 in addition to the arrangement of the second embodiment (FIG. 15).

Figure 21:
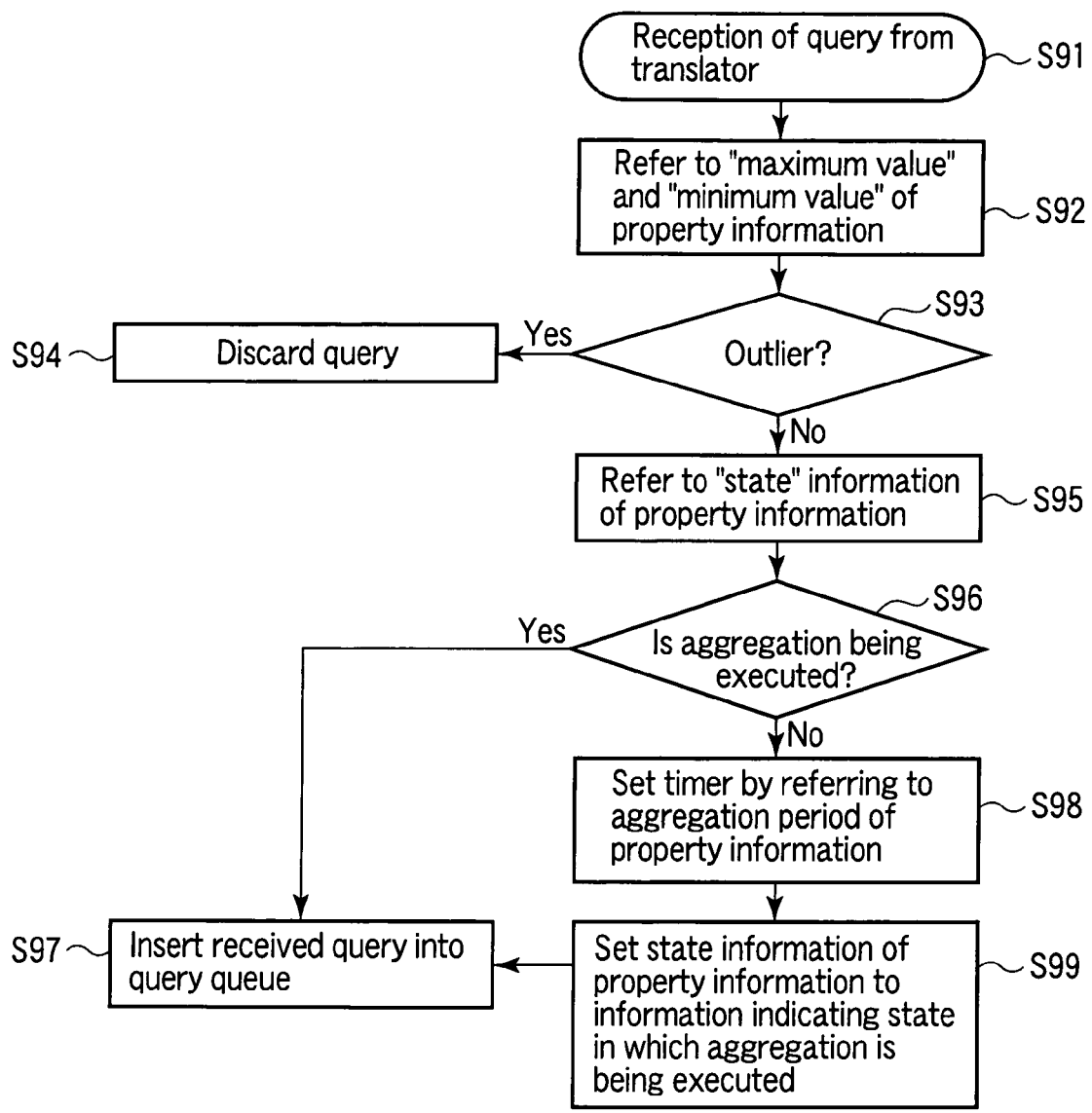
FIG. 21 is a flowchart showing an example of operation to be performed when an aggregator according to the third embodiment receives a query.

An example of the operation of the aggregator 12 at the time of reception of a query from a translator 11 will be described next with reference to FIGS. 20 and 21 and the like.

When receiving a query from the translator 11 via a query reception unit 51 (step S91), the aggregator 12 causes the outlier determination unit 52 to determine whether the set value of the query is an outlier (step S92). The outlier determination unit 52 refers to the maximum and minimum values of the property information 81. If the set value of the query is larger than the maximum value or smaller than the minimum value, the outlier determination unit 52 determines that the set value is an outlier.

If the set value is an outlier (step S93), the aggregator 12 discards the query (step S94).

If the set value is not an outlier (step S93), a state checking unit 53 checks the execution state of the aggregator 12 (step S95).

If the state indicates that aggregation is being executed (step S96), the aggregator 12 causes a query aggregation unit 56 to insert the received query into a query queue 82 (step S97).

If the state indicates that aggregation is not being executed (step S96), the aggregator 12 changes the state information of property information 81 to information indicating a state in which aggregation is being executed (step S99), and causes the query aggregation unit 56 to insert the received query into the query queue 82 (step S98). In this case, the aggregator 12 causes a timer unit 55 to set the timer by referring to period information (step S98).

As described above, the gateway of this embodiment can reduce the query processing load on the IP controller while performing control with a set value being limited within an arbitrary range by aggregating queries upon excluding outliers.

Fourth Embodiment

The fourth embodiment will exemplify the operation to be performed when the gateway in the third embodiment notifies a user (i.e., the client 2 as the query transmission source) of the acceptance of a query upon receiving a control result from an IP controller. The following description mainly concerns differences from the third embodiment. Obviously, however, it is possible to apply, to the first or second embodiment, "the arrangement for causing the gateway to notify a user of the acceptance of a query upon receiving a control result from an IP controller" according to the fourth embodiment.

In a facility network, when, for example, an arbitrary value is to be set in the property of a given device, it is sometimes desirable to return the value set in the device for acknowledgement as well as setting the value. A query to set an arbitrary value in the property of a given device and return the value actually set in the device is called a readback query, which is defined by a protocol such as BACnet/IP.

Before transferring a query to an IP controller, the gateways according to the first to third embodiments returns a query acceptance notification containing no information of an actual control result. Upon receiving a readback query, however, the gateway preferably waits until a control result notification is sent from the IP controller after transferring a query to the IP controller, and returns a query acceptance notification containing the control result to the user after receiving the control result notification. When, for example, a given user sets the operating temperature of an air conditioner to 28°, information indicating the operating temperature actually set in the air conditioner is returned to the user. If, however, query aggregation is performed, the value set by the user may differ from the value of the control result returned to the user.

There will now be described an arrangement example of the gateway referring to FIG. 22.

A difference from the third embodiment is that a translator 11 includes a control result reception unit 29 in addition to the arrangement of the third embodiment (FIG. 20).

The translator 11 causes a query transmission unit 28 to transmit a query to an IP controller, and then waits for a control result notification from the IP controller. Thereafter, the translator 11 causes the control result reception unit 29 to receive the control result.

An example of the operation of the translator 11 at the time of reception of a query from a user will be described next with reference to FIGS. 22 and 23 and the like.

Figure 23:
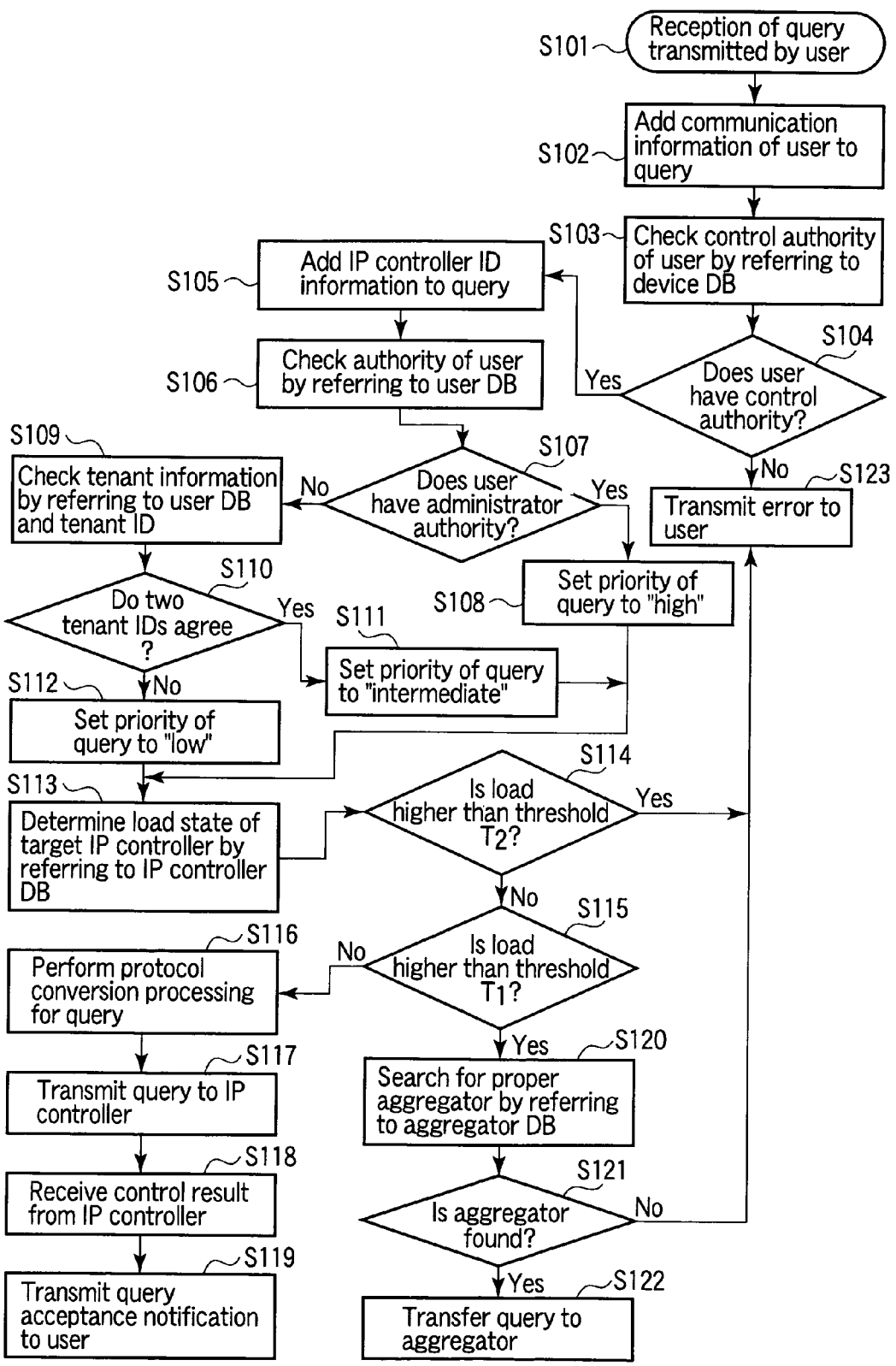
FIG. 23 is a flowchart showing an example of operation to be performed when a translator according to the fourth embodiment receives a query from a user.

Step S101 in the sequence in FIG. 23 is the same as step S61 in the sequence in FIG. 17. Steps S103 to S117 in the sequence in FIG. 23 are respectively the same as steps S62 to S76 in the sequence in FIG. 17. Steps S119 to S123 in the sequence in FIG. 23 are respectively the same as steps S77 to S81 in the sequence in FIG. 17.

When receiving a query from a user via a query reception unit 21 (step S101), the translator 11 adds communication information to the query (step S102).

Figures 24, 25, 27:
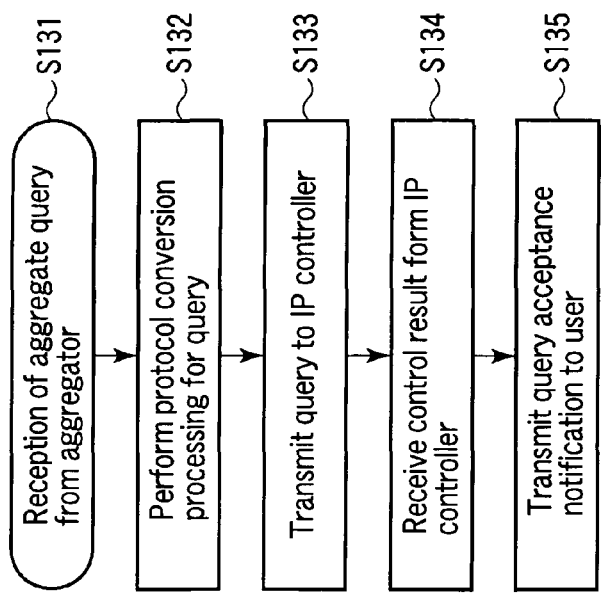
FIG. 24 is a view showing an example of the information of a query to which communication information is added.
FIG. 25 is a flowchart showing an example of operation to be performed when the translator according to the fourth embodiment receives an aggregate query.
FIG. 27 is a view showing an example of the attribute information of a state determination DB.

FIG. 24 shows an example of a query to which an IP controller ID, priority information, and communication information are added.

This communication information is information for returning a query acceptance notification to a user later, and corresponds to, for example, a set of the IP address and port number of the user. Communication information can be obtained by using, for example, the Unix socket function.

If the load determination unit 25 determines that the load on the IP controller is equal to or less than a threshold $T_2$ (step S114) and is equal to or less than a threshold $T_1$ (step S115), the protocol conversion unit 27 performs protocol conversion of the query (step S116). The query transmission unit 28 then transmits the query to the IP controller (step S117). Thereafter, the control result reception unit 29 receives a control result from the IP controller (step S118), and a query acceptance notifying unit 30 returns the control result to the user (step S119).

If the load on the IP controller is equal to or less than the threshold $T_2$ and is higher than the threshold $T_1$ (steps S114 and S115), an aggregator selection unit 33 selects a proper aggregator 12 (step S120). If a proper aggregator ID is found (step S121), a query transfer unit 34 transfers the query to the aggregator 12 (step S122).

When the aggregator 12 in this embodiment causes a query aggregation unit 56 to aggregate queries, the aggregator 12 aggregates the pieces of communication information of the respective queries as well as the set values of the queries. Therefore, an aggregate query may have a plurality of pieces of communication information. This makes it possible to return, afterward, query acceptance notifications to the respective senders of the queries which have been aggregated.

An example of the operation of the translator 11 at the time of reception of an aggregate query from the aggregator 12 will be described next with reference to FIGS. 22 and 25 and the like.

When receiving an aggregate query from the aggregator 12 via an aggregate query reception unit 35 (step S131), the translator 11 causes a protocol conversion unit 27 to perform protocol conversion of the query (step S132), and causes the query transmission unit 28 to transmit the query to the IP controller (step S133). Thereafter, the translator 11 causes the control result reception unit 29 to receive a control result from the IP controller (step S134), and causes the query acceptance notifying unit 30 to return the control result to the user (step S135). The query acceptance notifying unit 30 determines a transmission destination user by referring to the communication information of the query. If queries from a plurality of users are aggregated, control results are transmitted to the plurality of users.

As described above, even if queries are aggregated by adding pieces of communication information concerning users to the queries, the gateway in this embodiment can return control result notifications returned from the IP controller to the users upon containing them in query acceptance notifications.

Fifth Embodiment

The fifth embodiment will exemplify the operation to be performed when the gateway in the fourth embodiment aggregates queries in consideration of the state of a device managed by an IP controller. The following description mainly concerns differences from the fourth embodiment. Obviously, however, it is possible to apply "the arrangement for causing the gateway to aggregate queries in consideration of the state of a device managed by an IP controller" according to the fifth embodiment to the first, second, or third embodiment.

A facility network sometimes includes a device which, once receiving a specific control instruction, will not accept other control instructions for a predetermined period of time. If control instructions are transmitted to a device in a state in which it does not accept other control instructions, the load on the device or the IP controller increases. Since the intention of the user is not reflected, the user needs to perform operation to transmit a control instruction again. For example, in an air conditioner, there is a preparation time of several min from the instant a heating or cooling operation start instruction is received to the instant hot or cool air is actually blown. Performing operation start control on the air conditioner during preparation will impose an extra load on the air conditioner or the IP controller.

In the following description, a control instruction which, once accepted, prohibits acceptance of other control instructions for a predetermined period of time will be referred to as an "exclusive query". An exclusive query has the same information as that of a general query.

If the gateway in this embodiment determines, in consideration of the state of a device, that transmitted queries will not be accepted, the gateway aggregates the queries. This prevents an extra load from being imposed on the device or the IP controller. Note that in this embodiment, queries to be aggregated include not only a query to set an arbitrary value in the property of a given device but also a query to start/stop the operation of a given device. This query does not have a parameter arbitrarily set by a user. Therefore, aggregating this query is equivalent to aggregating the communication information of the query.

There will now be described an arrangement example of the gateway referring to FIG. 26.

Figure 22:
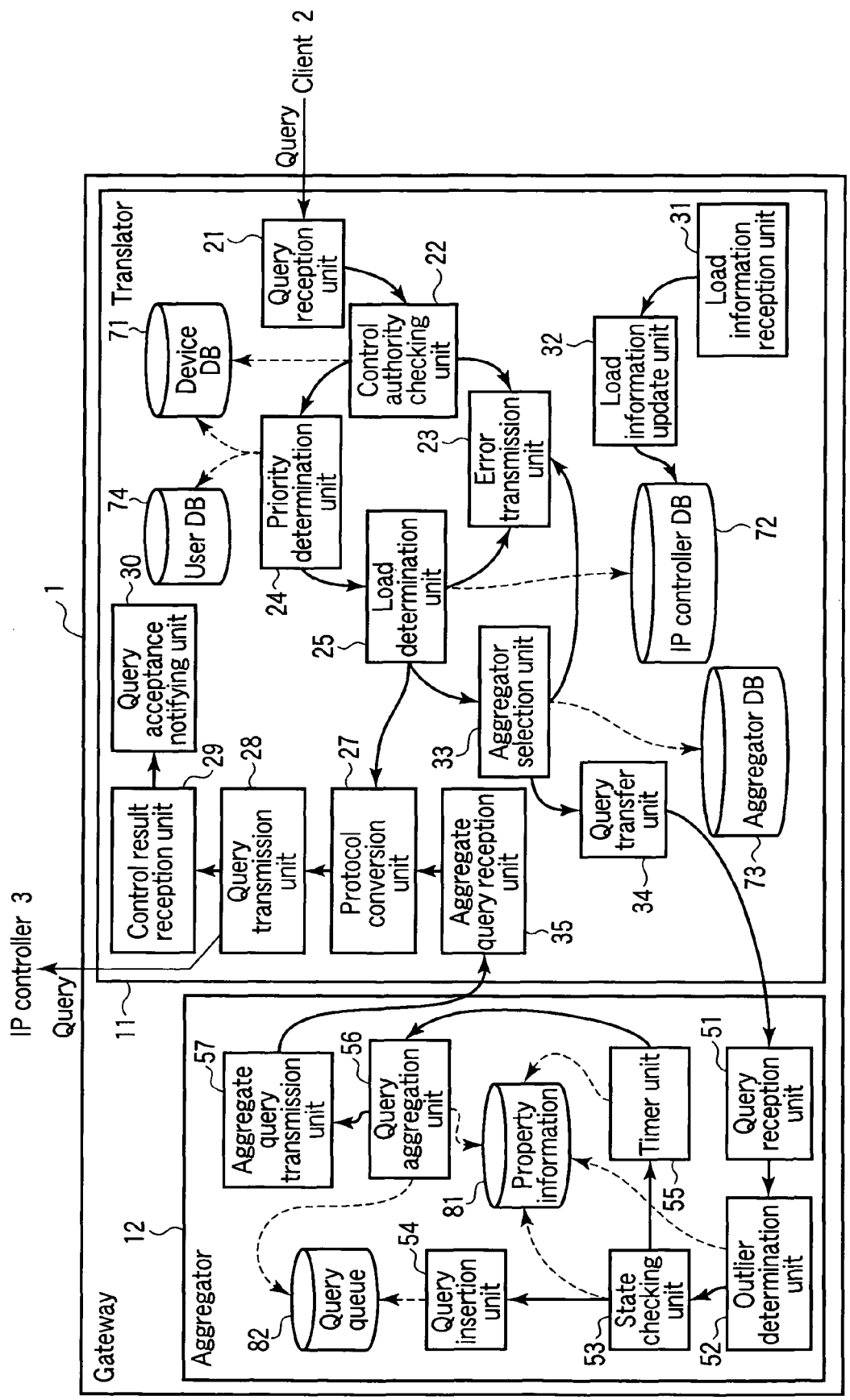
FIG. 22 is a block diagram showing an arrangement example of a gateway according to the fourth embodiment.

A difference from the fourth embodiment is that a translator 11 includes a state determination unit 26 and a state determination database (state determination DB) 75 in addition to the arrangement of the fourth embodiment (FIG. 22).

The state determination unit 26 grasps the state of a device by referring to the state determination DB 75, and aggregates queries.

FIG. 27 shows an example of the attribute information of the state determination DB 75. In the example in FIG. 27, the state determination DB 75 includes five attributes, i.e., {device ID, instruction ID, uncontrollable period, time stamp, state}. The main key of them is the device ID. For each device ID, the translator 11 manages "instruction ID" which is the identification information of the exclusive query, "uncontrollable period" which is a period during which no control is accepted, "time stamp" which indicates the time at which the exclusive query is transmitted to the IP controller, and "device state". In this case, the device state is either "controllable" or "uncontrollable". In a device in which there is no exclusive query, there is no information of an instruction ID, and the state is always "controllable".

An example of the operation of the translator 11 at the time of reception of a query from a user will be described next with reference to FIGS. 26 and 28 and the like.

Figure 28:
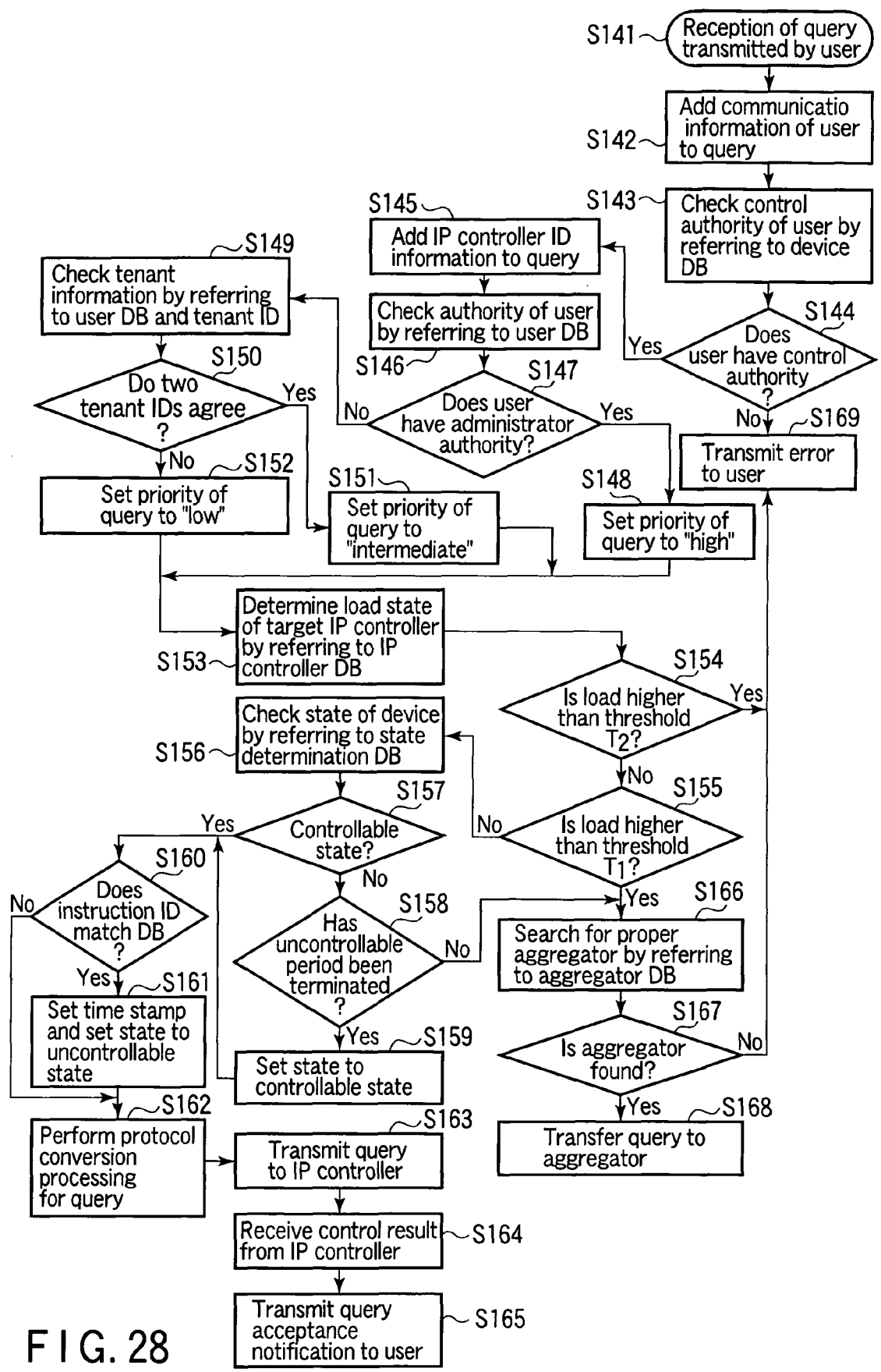
FIG. 28 is a flowchart showing an example of operation to be performed when a translator according to the fifth embodiment receives a query from a user.

Steps S141 to S155 in the sequence in FIG. 28 are respectively the same as steps S101 to S115 in the sequence in FIG. 23. Steps S162 to S169 in the sequence in FIG. 28 are respectively the same as steps S116 to S123 in the sequence in FIG. 23.

The translator 11 causes a load determination unit 25 to determine the load on a target IP controller (step S153). If the load is equal to or less than a threshold $T_2$ (step S154) and is equal to or less than a threshold $T_1$ (step S155), the translator 11 causes the state determination unit 26 to check the state of the device by referring to the state determination DB 75 (step S156).

If the state of the control target device for the query is "controllable" (step S157), the translator 11 determines whether the query is an exclusive query (the process advances to step S160).

If the state of the control target device for the query is "uncontrollable" (step S157), the translator 11 determines from the time stamp, the uncontrollable period, and the current time whether the uncontrollable period is terminated. If the uncontrollable period is not terminated (step S158), since the device is currently set in the uncontrollable state, the translator 11 transfers the query to the proper aggregator 12 to perform query aggregation (steps S166 to S168). If the uncontrollable period is terminated (step S158), the translator 11 sets the state of the state determination DB 75 to "controllable" (step S159), and determines whether the query is an exclusive query (the process advances to step S160).

If YES is obtained in step S157 or S158 and the instruction ID in the state determination DB 75 matches the instruction ID of the query, the query is an exclusive query.

If the query is an exclusive query (step S160), the current time is set as a time stamp, and the state is set to "uncontrollable" (step S161). The translator 11 causes the protocol conversion unit 27 to perform protocol conversion processing for the query (step S162).

If the query is not an exclusive query (step S160), the translator 11 performs protocol conversion processing (step S162) without updating the state determination DB 75 (skipping step S161).

Upon performing protocol conversion processing, the translator 11 causes a query transmission unit 28 to transmit the query to the IP controller (steps S163 to S165).

As described above, the gateway of this embodiment has the function of determining the state of a device and determining whether to aggregate queries. This can prevent an extra load from being imposed on a device in a state in which it does not accept any control instructions or the IP controller when control instructions are transmitted to the device.

Note that the respective functions described above can be implemented by causing a computer having a proper mechanism as software to perform processing.

In addition, this embodiment can be implemented as a program for causing a computer to execute a predetermined sequence, causing the computer to function as predetermined means, or causing the computer to implement predetermined functions. In addition, the embodiment can be implemented as a computer-readable recording medium on which the program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gateway apparatus comprising:
a translator which is located on a boundary between a first network and a second network and performs protocol conversion of a control instruction, the first network being connected to at least one controller for executing the control instruction for at least one device, the second network being connected to at least one client which transmits the control instruction; and
at least one aggregator which aggregates the plurality of control instructions,
wherein the translator includes:
an acquisition unit configured to acquire load information concerning a load on each of the controllers via the first network;
a control instruction reception unit configured to receive a control instruction for a desired device from at least one client via the second network;
a determination unit configured to determine whether the control instruction is an aggregation target, based on the load information on a controller corresponding to the device to which the control instruction is targeted, when the control instruction is received;
a first transfer unit configured to transfer the control instruction to the aggregator corresponding to the control instruction, when it is determined that the control instruction is an aggregation target; and
a second transfer unit configured to receive an aggregate control instruction from the aggregator, and
wherein the aggregator includes:
a third transfer unit configured to receive the control instruction from the translator;
an aggregation unit configured to aggregate the plurality of control instructions which have been received into one aggregate control instruction; and
a fourth transfer unit configured to transfer the aggregate control instruction to the translator.

2. The apparatus according to claim 1, wherein
the aggregator is provided for each combination of the device and the control instruction,
the control instruction includes first identification information identifying the control instruction and second identification information identifying the device to which the control instruction is targeted, and the translator further includes a selection unit configured to select an aggregator to which the control instruction is transferred based on the first identification information and the second identification information contained in the control instruction.

3. The apparatus according to claim 1, wherein
the aggregator further includes
a control instruction queue configured to retain the received control instruction, and
a timer configured to start a timer when a first control instruction is retained in the control instruction queue, and
the aggregation unit of the aggregator aggregates control instructions retained in the control instruction queue into one aggregate control instruction when the timer reaches a predetermined count value.

4. The apparatus according to claim 1, wherein
the load information is a numerical value indicating a load on each of the controller, and
the determination unit of the translator compares a numerical value indicated by the load information of a controller corresponding to the device to which the received control instruction is targeted with a first threshold and a second threshold larger than the first threshold, sets the control instruction as an aggregation target if the numerical value is not more than the second threshold and is larger than the first threshold, does not set the control instruction as an aggregation target if the numerical value is not more than the first threshold, and discards the control instruction if the numerical value is larger than the second threshold.

5. The apparatus according to claim 4, wherein the translator further includes a notification unit configured to notify a client as a transmission source of the control instruction of a message indicating an error if the numerical value is larger than the second threshold.

6. The apparatus according to claim 1, wherein
the translator further includes a priority information adding unit configured to add priority information indicating a priority of the control instruction to the received control instruction, and
the aggregation unit of the aggregator aggregates the plurality of control instructions into one aggregate control instruction in consideration of the priority information added to each of the plurality of control instructions.

7. The apparatus according to claim 1, wherein
the control instruction includes a set value associated with the device to which the control instruction is targeted,
the aggregator further includes an allowable range determination unit configured to determine whether the set value information contained in the control instruction received from the translator falls within an allowable range, and
the aggregation unit of the aggregator aggregates the plurality of control instructions into one aggregate control instruction in consideration of a result of the determination with respect to each of the plurality of control instructions.

8. The apparatus according to claim 1, wherein
the translator further includes a state determination unit configured to determine, when the control instruction is received, whether the device to which the control instruction is targeted is in a controllable state, and
the first transfer unit of the translator transfers the control instruction to the aggregator corresponding to the control instruction, when it is determined that the device is not in a controllable state.

9. The apparatus according to claim 1, wherein the translator further includes a control instruction transmission unit configured to transmit the aggregate control instruction received from the aggregator or the control instruction which is not determined as the aggregation target to the controller via the first network.

10. The apparatus according to claim 9, wherein the translator further includes a protocol conversion unit configured to perform protocol conversion of the aggregate control instruction received from the aggregator or the control instruction which is not determined as the aggregation target so as to comply with a protocol used between the gateway apparatus and the controller before transmission by the control instruction transmission unit to the controller.

11. The apparatus according to claim 1, wherein
the translator further includes
a sender information adding unit configured to add sender information indicating a client as a transmission source of the control instruction to the received control instruction, and
a control result notification reception unit configured to receive a control result notification corresponding to the control instruction from the controller after the control instruction is transmitted to the controller,
the aggregation unit of the aggregator aggregates the sender information added to each of the control instructions when aggregating the plurality of control instructions into one aggregate control instruction, and
the translator further includes a control result transmission unit configured to transmit, when a notification of the control result is received, the control result to each of clients as transmission sources of the respective control instructions associated with the aggregate control instruction by referring to the sender information added to the aggregate control instruction.

12. The apparatus according to claim 1, wherein the first network is a control system network, and the second network is an OA system network.

13. A control instruction processing method comprising: acquiring, in a translator which a gateway apparatus includes, via a first network for connecting at least one controller for executing a control instruction for at least one device, load information concerning a load on each of the controllers; receiving, in the translator, a control instruction for a desired device from at least one client via a second network different from the first network; determining, in the translator, whether the control instruction is an aggregation target, based on the load information of a controller corresponding to the device to which the control instruction is targeted, when the control instruction is received; transferring, in the translator, the control instruction to the aggregator corresponding to the control instruction, when it is determined that the control instruction is an aggregation target; receiving, in an aggregator which the gateway apparatus includes, the control instruction from the translator; aggregating, in the aggregator, the plurality of control instructions which have been received into one aggregate control instruction; transferring, in the aggregator, the aggregate control instruction to the translator; and receiving, in the translator, the aggregate control instruction from the aggregator.

14. A non-transitory computer readable storage medium storing instructions of a computer program which when executed by a computer results in performance of steps comprising: acquiring, in a translator which a gateway apparatus includes, via a first network for connecting at least one controller for executing a control instruction for at least one device, load information concerning a load on each of the controllers; receiving, in the translator, a control instruction for a desired device from at least one client via a second network different from the first network; determining, in the translator, whether the control instruction is an aggregation target, based on the load information of a controller corresponding to the device to which the control instruction is targeted, when the control instruction is received; transferring, in the translator, the control instruction to the aggregator corresponding to the control instruction, when it is determined that the control instruction is an aggregation target; receiving, in an aggregator which the gateway apparatus includes, the control instruction from the translator; aggregating, in the aggregator, the plurality of control instructions which have been received into one aggregate control instruction; transferring, in the aggregator, the aggregate control instruction to the translator; and receiving, in the translator, the aggregate control instruction from the aggregator.

* * * * *